July 20, 1926.
W. B. WARREN
ROAD MANUFACTURE
Filed Jan. 12, 1922
1,593,320
2 Sheets-Sheet 1
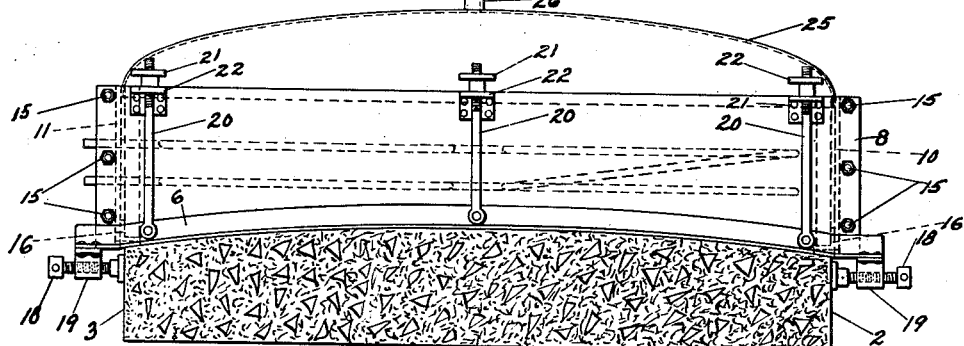
Fig. I
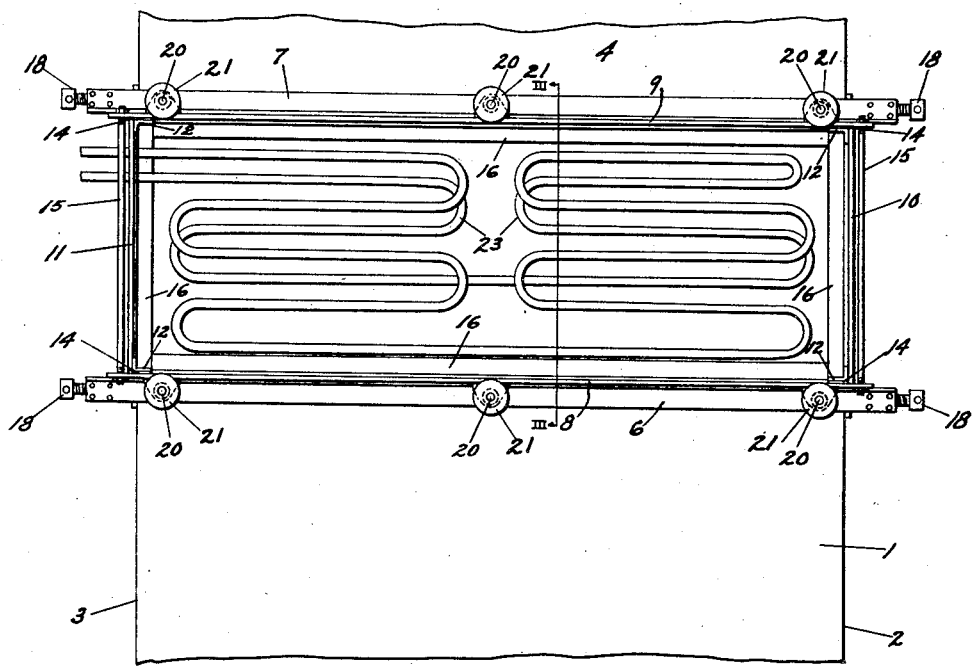
Fig. II
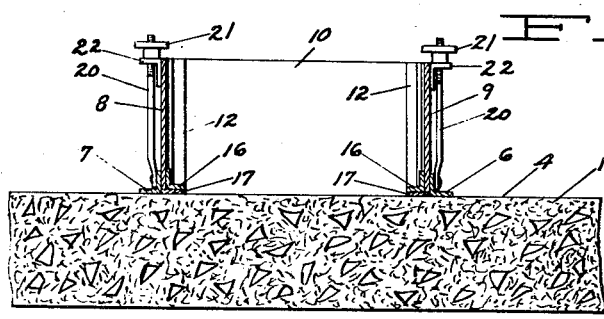
Fig. III
INVENTOR:
Walter B. Warren,
By
Atkins & Atkins,
ATTORNEYS.

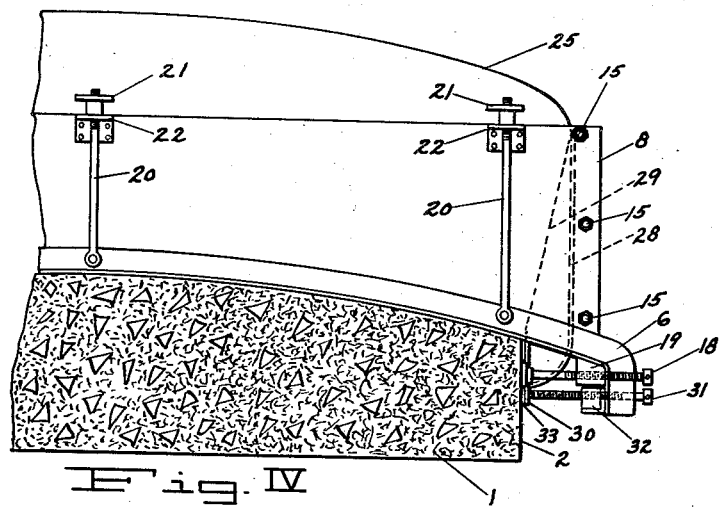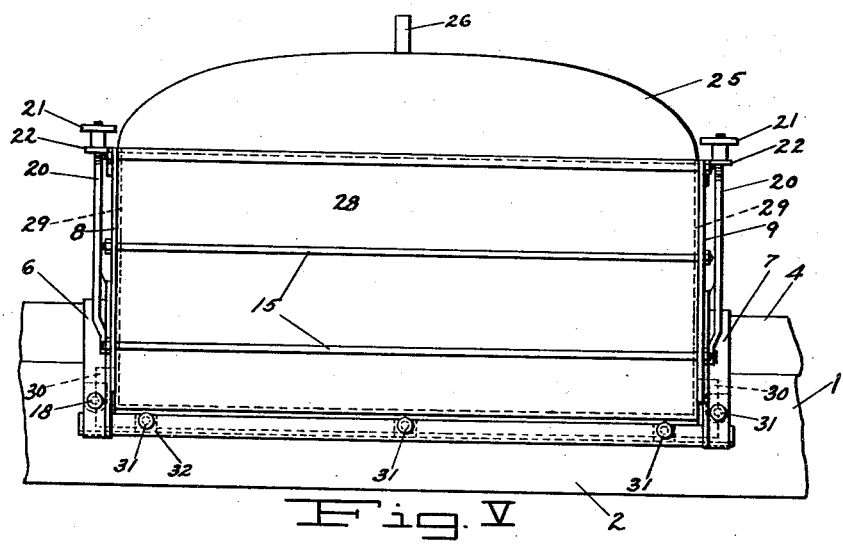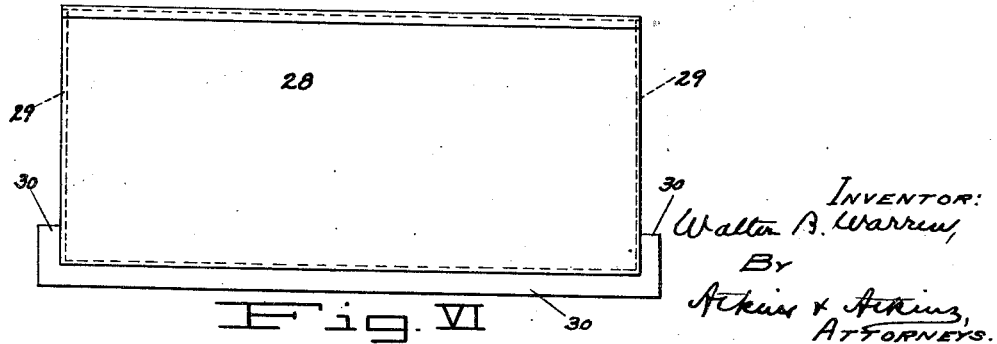

Patented July 20, 1926.

1,593,320

UNITED STATES PATENT OFFICE.

WALTER B. WARREN, OF PORTLAND, OREGON.

ROAD MANUFACTURE.

Application filed January 12, 1922. Serial No. 528,790.

My invention relates to the manufacture of roads, and has for its object a method or process and apparatus by which any porous base, for example one made of concrete, may be, after it is completed, set, and in place, impregnated with bitumen to a depth sufficient to afford a waterproof layer of composite material so incorporated or blended with the material of the base as to constitute a part of it and to be inseparable from it under all conditions to which it is ordinarily subjected in use.

The term concrete is used throughout this specification to denote any porous substance that may be variously made of cements, as for example of hydraulic cement, such for example as Portland or other cement that sets after being mixed with water to form a porous, solid mass, and which, when combined with other materials known as coarse and fine aggregates, is commonly used in or may be suitable for road construction.

The term bitumen is used likewise to denote any substance having the characteristics of pitch or asphalt. At ordinary atmospheric temperatures it is a waterproof substance having certain elastic qualities, and whi'. upon the application of moderate heat, becomes a viscous liquid, whose viscosity diminshes with its rise in temperature, until at a temperature say of 400 degrees Fahrenheit or thereabouts, it disappears and the liquid becomes fluid possessing substantially the same specific gravity as water. My invention comtemplates the use, also, of a waterproofing constant liquid, such as liquid asphalt or coal tar.

In accordance with my invention a porous base, as of concrete, is first made complete, and after it is in place, complete and initially or finally set, the bitumen is incorporated with it.

In order to apprehend correctly the nature of my invention, cognizance must be taken of the conditions that exist in road construction, and also, regarding the two substances which I employ in the practice of my process, the respective properties of the same, namely, that of permanent stability and porosity in the concrete or base, and that in the bitumen of waterproofness, elasticity, and increased liquidity upon application of heat. Stability is an essential element in all roads, while waterproofness and, to a degree, elasticity, are desirable and useful qualities. My invention effectively and economically brings together in one structure that combination of those three qualities just named, which combination is lacking in each element of the composite mass, considered separately.

To simply apply liquid asphalt to a concrete road, is an obvious operation, but the doing of it in a way to make the constituent elements hold together so as to meet service requirements in use, has been, prior to my invention, an unsolved problem.

My invention solves the problem through the infiltration to an adequate depth, of the liquid bitumen into the porous base. Attempts heretofore made to construct a road by merely coating a concrete base with bitumen have failed chiefly because of naturally repugnant properties in the two substances employed, towit, attraction of moisture in the one, and repulsion of moisture in the other.

It has long been understood in the art, that whenever bitumen, however hot, is applied to the surface of concrete in the open air, it will not stick to it permanently. A sufficient reason is that it becomes instantly chilled, to such a degree at least as to form a film along the plane of contact. The effect of said film formed by chilling is that of a dam to close the ends of the pores or capillaries of the concrete against penetration of the bitumen into them, and to restrict the layer of bitumen to nothing more than a mere skin or superficial coating. In such a case, the skin or coating may, under favorable conditions, stick for a little while, but as soon as moisture reaches it, which is certain to take place through the capillaries or pores of the base, it causes the bitumen to tend to separate from the base by a positive action due to that repulsion to moisture which is a characteristic natural property of bitumen. That tendency to separate is augmented by mechanical action due to the jarring of a road under traffic.

To overcome and practically to remove that difficulty, my invention makes provision for the application of heat to the concrete base so as first to vacate, to a substantial and sufficient degree or depth, the outer portions of the pores or capillaries of the concrete, and to then fill the same with bitumen liquefied by heat and driven into the pores under pressure.

Considering that concrete has, to almost if not quite hydroscopic effect, affinity for moisture, and that it finds an unlimited supply thereof through its pores while in communication with the earth, it becomes necessary, in order to accomplish the object I propose, to vacate a portion of those pores preparatory to filling them with bitumen. This may be effectually accomplished by the application to the concrete of heat of sufficient degree and for a sufficient duration of time. My invention contemplates the employment of any means of vacating the pores or capillaries that may be devised, and contemplates, specifically, the use of heat for that purpose applied by aid of any suitable means supplied from any available source of heat by which it may be accomplished. The heat may be applied to the concrete base before the application to it of the bitumen, but I prefer to supply hot bitumen in sufficient body or volume to make it serve the double purpose of contributing, in one operation and substantially at one and the same time, both heat and bitumen to the concrete. The high temperature as hereinbefore specified, at which bitumen becomes without injurious effect upon it, freely fluid with substantially the same specific gravity as water is nearly double that of the boiling point of water (212 degrees) and is available for dispelling the water in the capillaries of the concrete by converting it into steam, which finds escape through the body of the liquid bitumen. Moreover, my preference for the use of hot bitumen as a means of heating the concrete is adopted because the bitumen acts as a blanket to the concrete with the effect of accomplishing the otherwise difficult operation of driving heat downwardly into the concrete.

I also prefer to use hot bitumen as above specified because it can be used in quantity sufficient to supply a head or weight for forcing the liquid bitumen into the capillaries of the concrete after they are vacated of their water contents. The driving force of the liquid bitumen may be indefinitely augmented by adding to the volume or head of the bitumen supply, or it may be increased by fluid pressure, as of air, which may be applied effectively by confining the liquid bitumen in a substantially air tight container in operative communication with the concrete undergoing treatment, and compressing the air within the container from above against the bitumen, thereby causing it to cooperate with the weight of the bitumen to drive it towards and into the concrete.

What constitutes my invention will be hereinafter specified in detail with a view to the foregoing general statement, and will be succinctly set forth in the appended claims.

In the accompanying drawings, I illustrate apparatus suitable for carrying my present invention into effect, with no greater particularity of detail than is deemed sufficient to afford a full explication of the method which constitutes the subject matter of this application.

In said drawings,

Figure I is a vertical cross section of a concrete roadbed or base, showing in side elevation apparatus applied thereto for accomplishing my process.

Figure II is a top plan view of the apparatus shown in Figure I, with the cover removed.

Figure III is a vertical section of my apparatus taken on the line III—III in Figure II, the heating coils being omitted.

Figure IV is a view corresponding to one end of Figure I showing a modification of the form of end plates shown in said figure.

Figure V is an end elevation of the apparatus shown in Figure IV.

Figure VI is a side elevation of the modified end plate shown in Figures IV and V, detached.

Referring to the numerals on the drawings, 1 indicates a porous base which, in the practice of my invention, is first manufactured in any preferred manner and of any preferred shape and dimensions. Though it is sufficient for my purposes that it constitutes only a stable foundation or roadbed and that it be porous, I prefer to make the base 1 of concrete, within the definition of that term hereinbefore specified. The base structure may be that of newly made or of old concrete. It will be understood, of course, that the base 1 is of substantially uniform width and of indeterminate length. It is built either above ground or in a trench in the earth which is excavated to accommodate it, and which is afterwards filled in, upon the completion of the road. In such case, the trench may be made in the first place wide enough to expose and render the opposite sides 2 and 3 of the base conveniently accessible to workmen; or, if the roadbed be an old one, temporary trenches may be excavated upon opposite sides of its sufficient to uncover for the occasion its sides 2 and 3. 4 indicates the top of the base that is, as specified, porous, and which extends in regularity of contour the entire length of the base. It is to the top 4, including joints or cracks and preferably, in whole or in part, to the sides 2 and 3 that my process is applicable.

In the practice of my present invention, it is necessary to provide some kind of a receptacle having an open bottom next the base 1 for holding, substantially without leakage, a waterproofing liquid like bitumen in contact with the base. In practice said receptacle is used for treatment at one time of an area of the base circumscribed by the receptacle. As the work progresses the receptacle is moved along the length of the base, which in that manner is bituminized, section by section in contiguous or overlapping sections, until the whole surface of it is covered to substantial uniformity.

In the drawings I show a quadrilateral receptacle of the kind last indicated, comprising combined frame side pieces 6 and 7 and side plates 8 and 9, and end plates 10 and 11, which may be severally made either of wood or of metal as preferred. The construction of said plates illustrated, for example, is of metal, and specification is made accordingly.

The frame side pieces 6 and 7 should be long enough to take in the entire width of the base, and should preferably extend beyond the sides 2 and 3 of the base 1, in order that the end plates 10 and 11 may be properly accommodated between the side plates 8 and 9, which, in effect, form part of the frame side pieces. If the width of the base 1 is sufficient to require such provision, the frame side pieces 6 and 7 should be strengthened against transverse stress, and should always be made stiff and unbending against such stress. This, in long reaches, can be accomplished, if need be, by a truss construction or the like in the making of the frame side pieces.

Provision must also be made for uniting the plates 8, 9, 10 and 11, into a receptacle having close fitted corners. I prefer to that end to make said plates in the form of single units and to form a receptacle of them by uniting them together with closely formed joints between them. The means provided for that purpose as illustrated are flanges 12 upon the plates 10 and 11 designed and adapted to make close abutment joints against the plates 8 and 9 through the mediation of packing strips 14 of any suitable compressible material severally placed between said plates and the flanges 12. Bolts 15 are, for example, provided at suitable intervals through the plates 8 and 9 for drawing those members together and into close contact effect with the flanges 12 through the packing strips 14. The lower edges of the plates 8 to 11, inclusive, are to like purpose, provided, respectively, with flanges 16, that constitute, in effect, one continuous flange about the lower edge of the receptacle formed of said plates. The flange 16 is underlaid with packing strips 17 which, in effect, like the flange itself, are collectively coextensive with the bottom of the receptacle defined by the plates 8 to 11.

The longitudinal contour of the bottom of each of the side plates 8 and 9, Figure I, is made, after the manner of the frame side pieces 6 and 7, to conform to the transverse surface contour of the base, so that they may be drawn, in effect, into close contact with the base, to form substantially airtight joints with the upper face thereof by abutment of the flanges 16 against the intermediate packing strips 17. The means employed for effecting said joints may suffice in one compressive operation to make like joints between the strips 17 and the end plates 10 and 11, said plates being united to the plates 8 and 9 by the compression of the latter against the former obtained through the bolts 15. A simple form of means for the purpose last indicated is shown in the drawings, and consists, in part, of oppositely acting clamping screws 18 mounted, respectively in brackets 19 having threaded apertures provided upon opposite ends, respectively, of each of the frame side pieces 6 and 7. The screws 18 may, of course, clamp against the bottom of the base instead of its sides, if preferred.

Cooperative with each of the frame side pieces 6 and 7, and the screws for clamping them to the base 1, is provided for each frame side piece one or usually a series of substantially vertical screws 20 of any number required. Each of said screws is operatively connected, as by nuts 21 and brackets 22, with the side plate 8 and 9 that is appropriated to the frame side piece carrying said screw, with the effect, in operation, of actuating said side plate towards the base and against the intermediate packing strip 17, or for relieving pressure thereagainst when necessary.

Within the receptacle formed by conjunction of the plates 8 to 11, inclusive, is provided any means of heat supply that may be suitable for heating to required degree (say 400° Fahrenheit as aforesaid) the same being represented, for example, by coils of pipe 23 that may rest upon the base or on supports a little above it. The coils communicate, in the operation of the apparatus, with any suitable source of heat supply, not illustrated. The necessary heat may be derived from superheated steam or from the direct heat of combustion of gaseous or other fuel.

The receptacle aforesaid may be provided with a cover 25 which may be used simply to conserve the heat supplied to the receptacle, or it may be united to the side and end plates of the receptacle by a peripherical airtight joint that cooperates with the receptacle, substantially as already specified, to form, in effect, what may be termed an airtight retort, closed at all points except at its bottom where it is united, in service, by air tight joints as hereinbefore specified. If a receptacle of airtight retort effect is used its cover 25 is penetrated by a close fitting pipe 26 that establishes operative communication between the interior of the retort and any suitable source of compressed air, not illustrated.

It is not always essential to employ air pressure in the carrying out of my process, although under some conditions it may be used to advantage. Ordinarily sufficient pressure may be derived by gravity through the employment of a volume of bitumen within the receptacle of a depth sufficient to afford a head necessary to produce the pressure required. The head in such case depends upon the effective depth of the receptacle, or, in other words, upon the width of the side and end plates 8 to 11, inclusive, which may be made to meet ordinary practical requirements.

Instead of the flat end plates 10 and 11, bellied or bowed end plates 28, as shown in Figures IV, V and VI, may be used with the advantage of distributing the bitumen both around the corners of the base 1 and against its sides 2 and 3, whereby impregnation of the base may be extended to the sides as well as to the top thereof, and whereby, if the base be laid on a bituminous layer or substance, the impregnation of the base may be extended to meet such a layer or substance, and so to provide a complete transverse bituminous covering or envelope for the base, protecting it on all sides against moisture.

The end plates 28 are provided with lateral flanges 29 and with face flanges 30 on their lower edges, to provide means for effecting tight joints between them, the side plates 8 and 9, and the faces 2 or 3 of the base 1, respectively. Also, for actuating the end plates 28 in the direction of the sides 2 or 3 of the base 1, so as to effect tight joints between them and the face flanges 30, screws 31, corresponding in function to the screws 18, and working in brackets 32 provided for them, respectively, on the frame side plates 8 and 9, may be employed. Packing strips 33 coextensive with the flanges 30 are used in connection with said flanges.

The operation of the apparatus above described in the carrying out of my process into effect may be described as follows.

A section or strip of the completed base 1 is first provided, whether it be by manufacture of a new piece of road, or in the selection for treatment of a piece of old road. In either case, in order to obtain good results, care should be exercised to insure that the base used is substantially clean and in condition for the application of my process. Upon the base, across the top thereof, the frame sidepieces 6 and 7 with the side plates 8 and 9 and the plates 10 and 11 are loosely but correlatively assembled. After the side pieces 6 and 7 are set in place across the top of the base, they are firmly secured to it, as by the aid of the clamping screws 18 set in firm abutment against the opposite sides 2 and 3 or against the bottom of the base. Then by aid of the bolts 15 and hand screws 20 the joints between the end plates and side plates and between the lower edges of said plates and the top of the base 1 are securely perfected and closed.

The receptacle defined by said plates is now ready for use, and a sufficient charge of bitumen is introduced into it. Then, upon application of heat, as through the coils 23, the temperature of the bitumen is raised to the required degree, say of 400 degrees Fahrenheit, as was already specified, and is maintained at that point for a considerable length of time, sufficient to accomplish the result desired, it being understood that the duration of the time of treatment, as last described, determines, in a large measure, the depth to which the bitumen will penetrate into the pores or capillaries of the base.

The effect of the application of bitumen against the base, in the manner specified, and maintained at high temperature for a sufficient period, will be to cause the heat of the bitumen to penetrate the base to a depth depending upon the time of treatment. The heating of the material of the base above the boiling point of water will, to the depth of the effectual penetration of the heat into the base, convert into steam the water contained within the capillaries of the base, thereby vacating the capillaries substantially to a corresponding depth. The steam so formed passes out through the liquid bitumen imparting to it a foamy appearance. As the capillaries become sufficiently vacated of water, the pressure of gravity, aided it may be, if desired, by air pressure supplied through the pipe 26, operating on the body of the liquid bitumen, will cause its infiltration into the capillaries as they are emptied of their watery contents, and will effect a filamentary impregnation of the material of the base by the bitumen to the extent of incorporating the two substances—bitumen and concrete, for example—into one common mass, of a thickness or depth depending in a large measure, for reasons already indicated upon the length of time of treatment.

After completion of the treatment of a section of base in the manner last described, the excess bitumen remains in the receptacle or, if desired, is drawn off for subsequent applications. The receptacle is loosened and moved along the length of the base until another section thereof, usually contiguous to or slightly overlapping the preceding one, is exposed within it for treatment. The operation is repeated, as before, again and again, until the work laid out is completed.

Removal of the residual bitumen from the base after each application may be made to substantial completeness, or enough of it may be left on the base to be worked up with other materials by any method usual or preferred, into a bituminous surface coating.

The heating of the surface of the base 1 is preferably accomplished by blanketing it for a sufficient period with hot bitumen, substantially in the manner described; but it may be accomplished in whole or in part, and perhaps to some advantage in saving of time, by heating by any suitable means the bare surface of the base, in advance of the subsequent application to it of the liquid bitumen.

If end pieces 28 are employed, the process is precisely the same as that already specified, the only addition being in the extension to the product of a little larger area of bituminization, and such as to cover the corners and sides of the base 1 as well as its top.

By my process cracks, fissures, or expansion joints are entirely filled with a waterproofing material that is incorporated, as heretofore specified, into the substance of the side walls thereof with the effect of preventing injurious intrusion thereinto of moisture.

What I claim is:

1. A process for the manufacture of roads, consisting of treating a porous base by applying bitumen to its surface, maintaining the bitumen in a freely fluid state and confining the same in a body of sufficient depth to create a substantial hydrostatic pressure against the base for a period sufficient to effect the impregnation of the base by the bitumen.

2. A process for the manufacture of roads, consisting in preparing a porous base, and in the subsequent application to a section thereof of a volume of bitumen confined in a body of substantial depth in a close contact therewith and kept heated to such a high degree and for such a period of time as to effect filamentary impregnation of the base by the bitumen.

3. A process of road making which consists in the filamentary impregnation of a porous base by a body of bitumen of substantial depth, said body being under pressure and maintained by heat in a state substantially as fluid as water, and in utilizing the residuals of the heat and of the bitumen for working up the bitumen with other materials into a bituminous surface-coating cohesive with the impregnated base.

4. A process of road making, comprising the impregnation of the capillaries of a concrete road base by confining against the same a body of bitumen of substantial depth, and maintaining the bitumen in a state substantially as fluid as water, whereby the pressure due to the weight of the body of the bitumen and its fluid condition serve to vacate the capillaries of water and replace the same with adhesive filaments of bitumen.

5. A process for road manufacture which consists in drying a porous base and in filling the moisture vacated pores with liquid bitumen by maintaining the bitumen in a substantially air-tight retort in contact with the base above the vacated pores, and in a highly heated fluid state.

6. A process for road manufacture which consists in drying a porous base and in filling the moisture vacated pores with liquid bitumen by maintaining the bitumen in a substantially air-tight retort in contact with the base above the vacated pores, and in a highly heated fluid state, and in subjecting the confined liquid bitumen to pressure.

7. Apparatus for waterproofing a porous base in road manufacture which consists of the combination with a receptacle having an open bottom, of means for tightly securing said receptacle to a road base substantially for the purpose specified.

8. Apparatus for waterproofing a porous base in road manufacture which consists of the combination with a receptacle having an open bottom, of means for tightly securing said receptacle to a road base substantially for the purpose specified, a cover for said receptacle forming means for converting said receptacle, in effect, into an air-tight retort.

9. Apparatus for waterproofing a porous base in road manufacture which consists of a receptacle having an open bottom and side walls, a cover for said receptacle forming means for converting the same, in effect, into an air-tight retort, means for tightly securing said receptacle to a road base, and means for admitting an air pressure supply to the interior thereof.

10. Apparatus for waterproofing a porous base in road manufacture which consists of the combination with a receptacle having an open bottom, of means for tightly securing said receptacle to a road base substantially for the purpose specified, a cover for said receptacle forming means for converting said receptacle, in effect, into an airtight retort, means for admitting air pressure supply, and means for effectively supplying heat to the interior of the receptacle, all substantially for the purpose specified.

11. Apparatus for waterproofing a porous base in road manufacture which consists of a receptacle having an open bottom and side walls, said receptacle being adapted to make a substantially water-tight joint at the bottom of its side walls with the base for the purpose specified, said receptacle having a cover portion whereby the receptacle is, in effect, an air-tight retort, means for admitting pressure supply to said retort, and means for effectively supplying heat to the interior of the receptacle.

In testimony whereof, I have hereunto set my hand.

WALTER B. WARREN.